United States Patent
Park et al.

(10) Patent No.: US 9,750,080 B2
(45) Date of Patent: *Aug. 29, 2017

(54) METHOD FOR TRANSMITTING DATA UNIT IN WIRELESS LOCAL AREA NETWORK SYSTEM AND APPARATUS FOR SUPPORTING SAME

(71) Applicant: LG Electronics Inc., Seoul (KR)

(72) Inventors: Jong Hyun Park, Anyang-si (KR); Hyang Sun You, Anyang-si (KR); Bong Hoe Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,582

(22) Filed: Mar. 4, 2016

(65) Prior Publication Data
US 2016/0192438 A1 Jun. 30, 2016

Related U.S. Application Data

(63) Continuation of application No. 14/357,452, filed as application No. PCT/KR2012/009798 on Nov. 19, 2012, now Pat. No. 9,313,068.
(Continued)

(51) Int. Cl.
*H04W 4/00* (2009.01)
*H04W 84/12* (2009.01)
(Continued)

(52) U.S. Cl.
CPC ........... *H04W 84/12* (2013.01); *H04L 5/0007* (2013.01); *H04L 27/261* (2013.01);
(Continued)

(58) Field of Classification Search
CPC ......................... H04L 5/0048; H04L 5/0053
See application file for complete search history.

(56) References Cited

U.S. PATENT DOCUMENTS

| 9,313,068 B2 * | 4/2016 | Park ................... H04W 84/12 |
| 2005/0180518 A1 | 8/2005 | Brotje ................. H04L 25/022 |
| | | 375/260 |

(Continued)

FOREIGN PATENT DOCUMENTS

| JP | 2004048716 A | 2/2004 |
| JP | 2006238421 A | 9/2006 |

(Continued)

OTHER PUBLICATIONS

XP068037252: James Wang (Media Tek Inc.) et al: "11ah Channelization Discussion;11-11-1175-03-00ah-11ah-channelization-discussion"; vol. 802.11ah, No. 3, Sep. 18, 2011 (retrieved on Sep. 18, 2011) pp. 1-7.

(Continued)

Primary Examiner — Kevin C Harper
(74) Attorney, Agent, or Firm — Dentons US LLP

(57) ABSTRACT

Provided is a method for transmitting a data unit in a wireless local area network system, according to one embodiment. The method comprises transmitting a signal field, transmitting a first data symbol for a first data field, and transmitting a second data symbol for a second data field. The signal field, the first data symbol, and the second data symbol are transmitted through a 1 MHz channel bandwidth having a band of 1 GHz or less. Two pilot tones are inserted to each of the first data symbol and the second data symbol.

10 Claims, 12 Drawing Sheets

Related U.S. Application Data

(60) Provisional application No. 61/561,729, filed on Nov. 18, 2011, provisional application No. 61/564,306, filed on Nov. 29, 2011.

(51) Int. Cl.
*H04L 27/26* (2006.01)
*H04L 5/00* (2006.01)

(52) U.S. Cl.
CPC ...... *H04L 27/2602* (2013.01); *H04L 27/2605* (2013.01); *H04L 27/2626* (2013.01)

(56) References Cited

U.S. PATENT DOCUMENTS

| | | | | |
|---|---|---|---|---|
| 2005/0201268 | A1* | 9/2005 | Aoki | H04B 7/10 370/208 |
| 2006/0250943 | A1* | 11/2006 | Mujtaba | H04B 7/12 370/210 |
| 2007/0147527 | A1* | 6/2007 | Egashira | H04L 5/0023 375/260 |
| 2008/0013504 | A1* | 1/2008 | Nishibayashi | G06F 3/14 370/338 |
| 2010/0260159 | A1 | 10/2010 | Zhang et al. | |
| 2011/0051706 | A1* | 3/2011 | Schmidl | H04L 5/0042 370/338 |
| 2011/0096796 | A1* | 4/2011 | Zhang | H04B 7/0669 370/474 |
| 2011/0299468 | A1* | 12/2011 | Van Nee | H04L 27/2613 370/328 |
| 2012/0201315 | A1* | 8/2012 | Zhang | H04L 1/0046 375/260 |
| 2012/0269069 | A1* | 10/2012 | Porat | H04W 72/1231 370/241 |
| 2012/0294392 | A1* | 11/2012 | Zhang | H04L 5/0023 375/340 |
| 2013/0121348 | A1* | 5/2013 | Zhang | H04L 29/06 370/474 |
| 2013/0215993 | A1* | 8/2013 | Taghavi Nasrabadi | H04L 27/2601 375/295 |

FOREIGN PATENT DOCUMENTS

| | | |
|---|---|---|
| KR | 1020040055227 A | 6/2004 |
| KR | 100987244 B1 | 10/2010 |
| KR | 1020110093559 A | 8/2011 |
| RU | 2388158 | 4/2010 |
| WO | 2010120692 A1 | 10/2010 |
| WO | 2011133619 A2 | 10/2011 |

OTHER PUBLICATIONS

XP055035943: Hongyuan Zhang "11ah Data Transmission Flow" URL: https://mentor.ieee.org/mentor/bp/StartPage (retrieved on Aug. 21, 2012) Nov. 7, 2011, Slides 1-15.

XP068037792: Sameer Vermani (Qualcomm): "Preamble Format for 1 MHz; 11-11-1482-02-00AH-Preamble-Format-for-1-mhz" vol. 802.11ah, No. 2, Nov. 7, 2011,(retrieved on Nov. 7, 2011) pp. 1-30.

"RTL Design of 1.2Gbps MIMO WLAN System and Its Business Aspect", R. Imashioya et al., IEEE.

"Design of 1.2 Gbps MIMO WLAN System for 4K Digital Cinema Transmission", W.A. Syafei et al., IEEE.

IEEE 802.11-11/1482r2: "Preamble Format for 1 MHz," Nov. 7, 2011.

* cited by examiner

FIG. 9
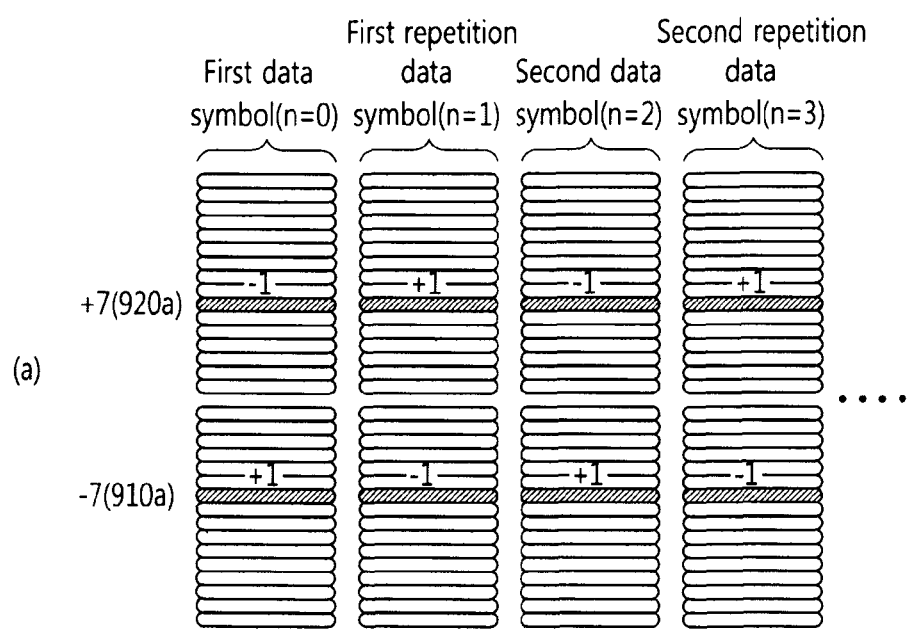
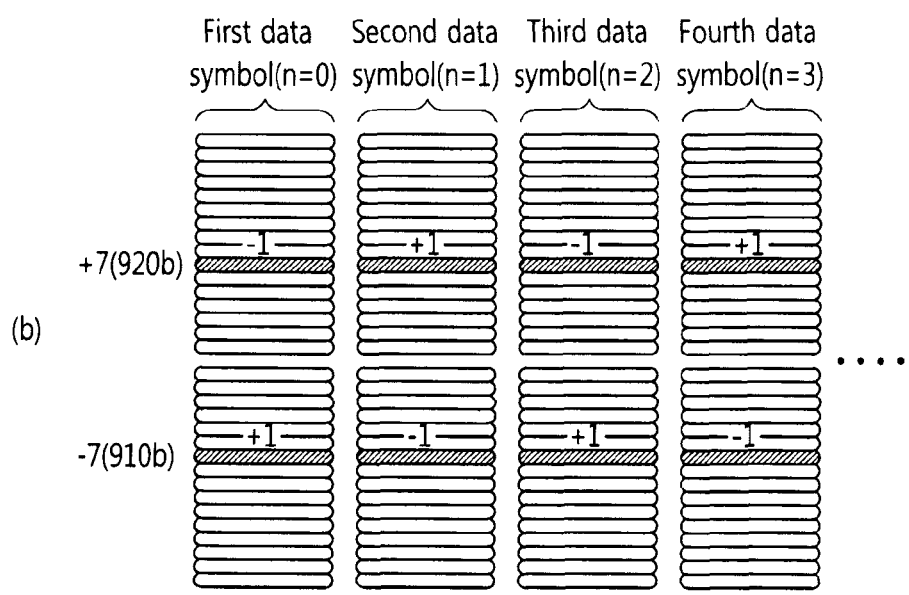

METHOD FOR TRANSMITTING DATA UNIT IN WIRELESS LOCAL AREA NETWORK SYSTEM AND APPARATUS FOR SUPPORTING SAME

This application is a Continuation of U.S. application Ser. No. 14/357,452 filed May 9, 2014, which is a National Stage under 35 U.S.C. 371 of International Application No. PCT/KR2012/009798 filed Nov. 19, 2012, which claims the benefit of U.S. Provisional Application Nos. 61/561,729 filed Nov. 18, 2011 and 61/564,306 filed Nov. 29, 2011, all of which are hereby incorporated by reference in their entirety.

BACKGROUND OF THE INVENTION

Field of the Invention

The present invention relates to wireless communication and more particularly, a method for transmitting data units in a wireless local area network (LAN) system and an apparatus for supporting the method.

Related Art

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

Unlike an existing wireless LAN system using 20/40/80160/80+80 MHz bandwidth at 2 GHz and/or 5 GHz frequency, which supports HT (High Throughput) and VHT (Very High Throughput), wireless LAN systems capable of operating below 1 GHz frequency are being proposed. If a wireless LAN system is operated below 1 GHz frequency, the corresponding service coverage can be more extended than that of the existing wireless LAN system, by which one AP is enabled to manage much more stations (STAs)

Meanwhile, change of frequency band and bandwidth in an employed radio channel, and an abrupt increase of the corresponding service coverage due to the change necessarily bring about the needs for a format of a new data unit and a method for transmitting the data unit which can be used for the next generation wireless LAN system.

SUMMARY OF THE INVENTION

The present invention provides a method for transmitting data units in a wireless LAN system and an apparatus supporting the method.

In an aspect, a method for transmitting data units in a wireless local area network system is provided. The method includes transmitting a signal field, transmitting a first data symbol for a first data field, and transmitting a second data symbol for a second data field. The signal field, the first data symbol and the second data symbol are transmitted over a 1 MHz channel bandwidth having a band of 1 GHz or less. Two pilot tones are inserted to each of the first data symbol and the second data symbol. The inserted pilot tone $P_n^k$ is defined as follows:

$$P_n^{\{-7,7\}} = \{\Psi_{n \bmod 2}, \Psi_{(n+1) \bmod 2}\}$$

$$P_n^k = 0, \text{ for } k \neq -7 \text{ and } k-7$$

where $P_n^k$ denotes a pilot tone about a k-th subcarrier of n-th symbol and $\Psi_0 = 1$, $\Psi_1 = -1$.

The method may further include transmitting a first repetition data symbol for a first data field formed as the first data field is repeated, and transmitting a second repetition data symbol for a second data field formed as the second data field is repeated. The first repetition data symbol and the second repetition data symbol maybe transmitted through the 1 MHz channel bandwidth having a band of 1 GHz or less. The data symbols may be transmitted in an order of the first data symbol, the first repetition data symbol, the second data symbol, and the second data symbol.

The two pilot tones may be inserted into the first repetition data symbol and the second repetition data symbol.

The signal field may include information indicating a use of Short Guard Interval (SGI).

Long Guard Interval (LGI) may be applied to the first data symbol and the first repetition data symbol.

The SGI may be applied to the second data symbol and the second repetition data symbol.

The LGI may be applied to the first data symbol, and GI is not applied to the first repetition data symbol.

The SGI may be applied to the second data symbol.

The SGI may be applied to the second repetition data symbol.

The signal field, the first data symbol, the first repetition data symbol, the second data symbol, and the second repetition data symbol may be transmitted through a single spatial stream.

In another aspect, a wireless apparatus for operating in a wireless local area network system is provided. The wireless apparatus includes a transceiver configured to transmit and receive a radio signal, and a processor operatively coupled with the transceiver and configured to transmit a signal field, transmit a first data symbol for a first data field, and transmit a second data symbol for a second data field. The signal field, the first data symbol and the second data symbol are transmitted over a 1 MHz channel bandwidth having a band of 1 GHz or less. Two pilot tones are inserted to each of the first data symbol and the second data symbol. The inserted pilot tone $P_n^k$ is defined as follows:

$$P_n^{\{-7,7\}} = \{\Psi_{n \bmod 2}, \Psi_{(n+1) \bmod 2}\}$$

$$P_n^k = 0, \text{ for } k \neq -7 \text{ and } k-7$$

where $P_n^k$ denotes a pilot tone about a k-th subcarrier of n-th symbol and $\Psi_0 = 1$, $\Psi_1 = -1$.

The processor may be configured to transmit a first repetition data symbol for a first data field formed as the first data field is repeated, and transmit a second repetition data symbol for a second data field formed as the second data field is repeated. The first repetition data symbol and the second repetition data symbol may be transmitted through the 1 MHz channel bandwidth having a band of 1 GHz or less. The data symbols may be transmitted in an order of the first data symbol, the first repetition data symbol, the second data symbol, and the second data symbol.

The two pilot tones may be inserted into the first repetition data symbol and the second repetition data symbol.

The present invention provides a PPDU (PLCP (Physical Layer Convergence Procedure) Protocol Data Unit) format supporting data transmission below 1 GHz frequency. STAs and APs operating in a wireless LAN system are capable of transmitting PPDUs compliant with a proposed format using 1/2/4/8/16/8+8 MHz channel bandwidth having a band of 1 GHz or less. Therefore, efficient data transmission and reception is possible in a wireless LAN system providing broad service coverage by employing frequency band below 1 GHz.

BRIEF DESCRIPTION OF THE DRAWINGS

FIG. 9 illustrates a pilot sequence according to OFDM symbols according to an embodiment of the present invention.

DESCRIPTION OF EXEMPLARY EMBODIMENTS

Figure 1:
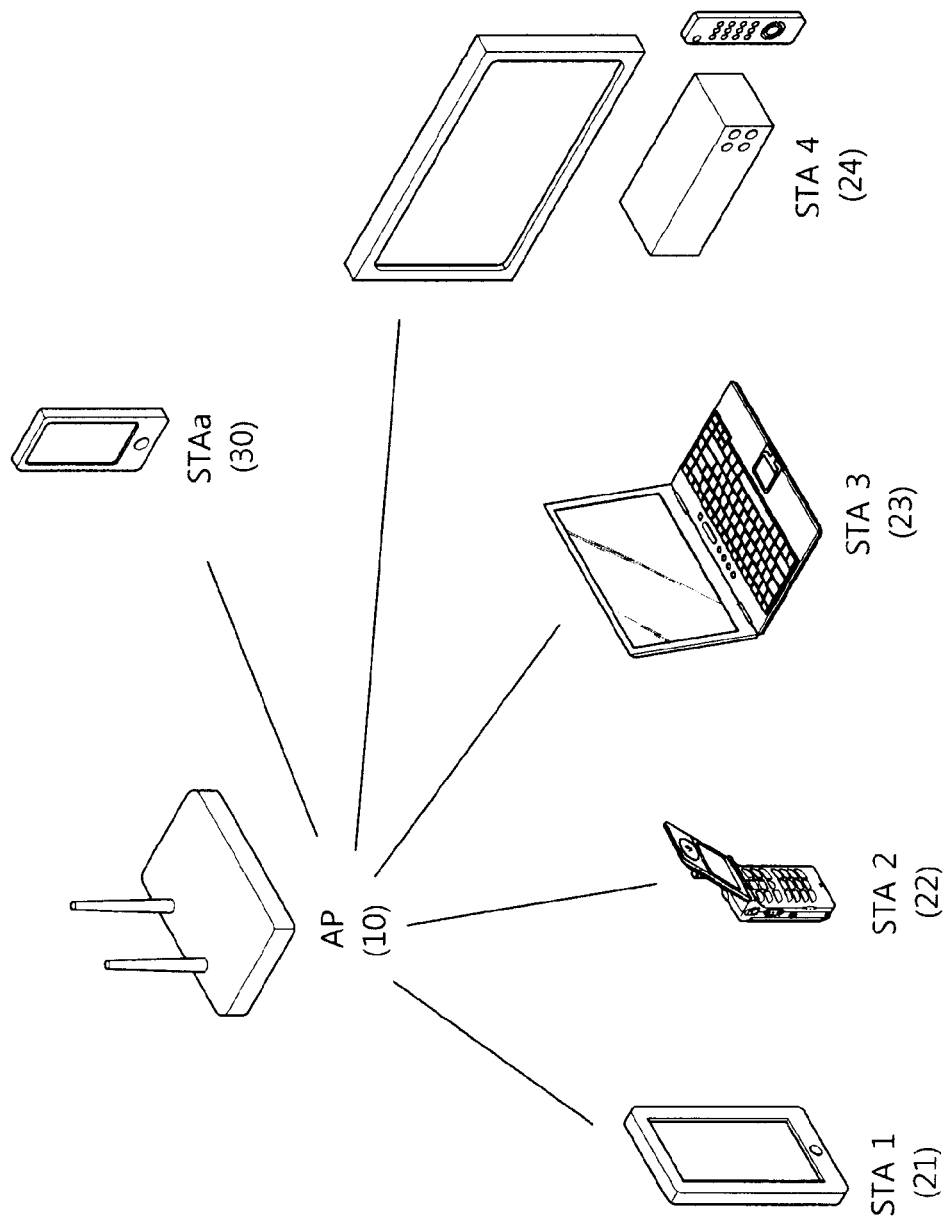
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1 21, STA2 22, STA3 23, STA4 24, and STAa 30, an AP (Access Point) 10 providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS)

of a WLAN, and QoS data can be transmitted in both a Contention Period (CP) and a Contention-Free Period (CFP).

In a wireless communication system, an STA cannot know the existence of a network immediately when the STA is turned on and the STA starts operating from a viewpoint of a wireless medium. Accordingly, any type of an STA should perform a network discovery process in order to access a network. The STA that has discovered networks through the network discovery process selects a network to be joined through a network selection process. Next, the STA joins the selected network and performs a data exchange operation performed in a transmission terminal/reception terminal.

In a WLAN system, a network discovery process is embodied by a scanning procedure. The scanning procedure is divided into passive scanning and active scanning. Passive scanning is performed based on a beacon frame that is periodically broadcasted by an AP. In general, in a WLAN, an AP broadcasts a beacon frame at a specific interval (e.g., 100 msec). The beacon frame includes information about a BSS managed by the beacon frame. An STA waits passively in order to receive the beacon frame in a specific channel. The STA obtains information about a network from the received beacon frame and then terminates the scanning procedure in the specific channel. Passive scanning is advantageous in that overall overhead is small because the passive scanning is performed if an STA has only to receive a beacon frame without a need to transmit an additional frame, but is disadvantageous in that the time taken to perform scanning is increased in proportion to the transmission period of a beacon frame.

In contract, in active scanning, an STA broadcasts a probe request frame actively in a specific channel and requests information about networks from all APs that have received the probe request frame. An AP that has received the probe request frame waists for a random time in order to prevent a collision between frames and transmits a probe response frame, including information about a network, to the STA. The STA receives the probe response frame, obtains the information about networks from the probe response frame, and then terminates the scanning procedure. Active scanning is advantageous in that scanning can be finished within a relatively short time, but is disadvantageous in that overall network overhead is increased because a frame sequence according to a request and a response is necessary.

The STA that has finished the scanning procedure selects a network according to its specific criterion and then, together with the AP, performs an authentication procedure. The authentication procedure is performed according to a 2-way handshake. The STA that has finished the authentication procedure, together with the AP, performs an association procedure.

The association procedure is performed according to a 2-way handshake. First, the STA transmits an association request frame to the AP. The association request frame includes information about the capabilities of the STA. The AP determines whether or not to permit association with the STA based on the information about the capabilities. The AP that has determined whether or not to permit association with the STA transmits an association response frame to the STA. The association response frame includes information indicating whether association has been permitted or not and information indicating a reason when association is permitted or failed. The association response frame further includes information about capabilities supportable by the AP. If the association is successfully completed, frames are normally exchanged between the AP and the STA. If the association is failed, the association procedure is attempted again based on information about a failure reason included in the association response frame or the STA may request association from another AP.

In order to overcome a limit to the communication speed that was considered as being weakness in a WLAN, IEEE 802.11n has been recently established as a technical standard. An object of IEEE 802.11n is to increase the speed and reliability of a network and to extend the coverage of a wireless network. More particularly, in order to support a High Throughput (HT) having a maximum data processing speed of 540 Mbps or higher, minimize an error in transmission, and optimize the data speed, IEEE 802.11n is based on Multiple Inputs and Multiple Outputs (MIMO) technology using multiple antennas on both sides of a transmitter and a receiver.

As a WLAN is actively propagated and applications employing the WLAN are diversified, there is a need for a new WLAN system that supports a throughput higher than the data processing speed supported by IEEE 802.11n. The next-generation WLAN system that supports a Very High Throughput (VHT) is a next version of an IEEE 802.11n WLAN system and is one of IEEE 802.11 WLAN systems which have recently been newly proposed in order to support a data processing speed of 1 Gbps or higher in a MAC Service Access Point (SAP).

Further to a conventional WLAN system that supports 20 MHz and 40 MHz, in a VHT WLAN system, transmission of bandwidth of 80 MHz, contiguous 160 MHz, and non-contiguous 160 MHz and/or transmission of bandwidth of no less than 160 MHz is to be supported. Further to the conventional wireless LAN system that supports up to 64 quadrature amplitude modulation (QAM), the VHT wireless LAN system supports 256QAM.

Since a multiuser-multiple input multiple output (MU-MIMO) transmitting method is supported in the VHT wireless LAN system for higher throughput, an AP may simultaneously transmit a data frame to at least one MIMO paired STA. The maximum number of paired STAs may be 4. When the maximum number of spatial streams is 8, up to 4 spatial streams may be allotted to the STAs.

Referring back to FIG. 1, in a WLAN system, such as that shown in FIG. 1, an AP 10 can transmit data to an STA group, including at least one of a plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

Data transmitted to the STAs may be transmitted through different spatial streams. A data packet transmitted by the AP 10 as a physical layer convergence procedure (PLCP) protocol data unit (PPDU) generated by a physical layer of the wireless LAN system to be transmitted or a data field included in the PPDU may be referred to as a frame. That is, a PPDU for single user (SU)-MIMO and/or MU-MIMO or the data field included in the PPDU may be referred to as an MIMO packet. A PPDU for MU may be referred to as an MU packet. In an example of the present invention, it is assumed that a group of STAs MU-MIMO paired with the AP 10 to be transmitted includes an STA1 21, an STA2 22, an STA3 23, and an STA4 24. At this time, spatial streams are not allotted to a specific STA of the group of STAs to be transmitted so that data may not be transmitted. On the other hand, it is assumed that an STAa 30 is combined with the AP, however, is not included in the group of STAs to be transmitted.

In order to support MU-MIMO transmission in a WLAN system, an identifier may be allocated to a target transmission STA group, and the identifier may be called a group ID. An AP transmits a group ID management frame, including group definition information, to STAs supporting MU-MIMO transmission in order to allocate a group ID to the STAs. The group ID is allocated to the STAs based on the group ID management frame prior to PPDU transmission. A plurality of group IDs may be allocated to one STA.

Table 1 below shows information elements included in the group ID management frame.

TABLE 1

| Order | Information |
|-------|-------------|
| 1 | Category |
| 2 | VHT action |
| 3 | Membership status |
| 4 | Spatial stream position |

The category field and the VHT action field are set to identify that the frame corresponds to a management frame and a group ID management frame used in the next-generation WLAN system supporting MU-MIMO.

As in Table 1, group definition information includes the membership status information, indicating whether an STA belongs to a specific group ID, and spatial stream position information indicating that what place is the spatial stream set of a relevant STA located from all the spatial streams according to MU-MIMO transmission if the STA belongs to the relevant group ID.

Since a plurality of group IDs is managed by one AP, membership status information provided to one STA needs to indicate whether the STA belongs to each of the group IDs managed by the AP. Accordingly, the membership status information may exist in an array form of subfields, indicating whether the STA belongs to each group ID. The spatial stream position information may exist in an array form of subfields, indicating a position of a spatial stream set occupied by an STA regarding each group ID, because the spatial stream position information indicates a position for each group ID. Furthermore, the membership status information and the spatial stream position information for one group ID may be implemented within one subfield.

If an AP transmits a PPDU to a plurality of STAs according to the MU-MIMO transmission scheme, the AP includes information, indicating a group ID, in the PPDU, and transmits the information as control information. When an STA receives the PPDU, the STA checks whether it is a member STA of a target transmission STA group by checking a group ID field. If the STA is checked to be a member of the target transmission STA group, the STA may check that what place is a spatial stream set, transmitted thereto, placed from all the spatial streams. Since the PPDU includes information about the number of spatial streams allocated to a reception STA, the STA can receive data by searching for spatial streams allocated thereto.

On the other hand, a TV white space (WS) is spotlighted as a frequency band that may be newly used in the wireless LAN system. The TV WS refers to a frequency band in an idle state that is left due to digitalization of analog TVs of the United States, for example, 54-698 MHz band. However, the above is only an example. The TV WS may be referred to as a licensed band that may be priorly used by a licensed user. The licensed user means a user licensed to use the licensed band and may be referred to as a licensed device, a primary user, and an incumbent user.

The AP and/or the STA that operates in the TV WS must provide a function of protecting the licensed user, which is because the licensed user priorly uses the TV WS band. For example, when a specific WS channel that is a frequency band divided to have specific bandwidth in the TV WS by regulation is previously used by the licensed user such as a microphone, in order to protect the licensed user, the AP and/or the STA may not use the frequency band corresponding to the corresponding WS channel. In addition, when the frequency band that is currently used for transmitting and/or receiving a frame is used by the licensed user, the AP and/or the STA must stop using the corresponding frequency band.

Therefore, a procedure of the AP and/or the STA determining whether the specific frequency band in the TV WS band may be used, that is, whether the licensed user exists in the frequency band must be preceded. Determining whether the licensed user exists in the specific frequency band is referred to as spectrum sensing. An energy detection method and a signature detection method are used as a spectrum sensing mechanism. It may be determined that the licensed user is using the frequency band when the intensity of a received signal is no less than a predetermined value or when a digital TV (DTV) preamble is detected.

Figure 2:
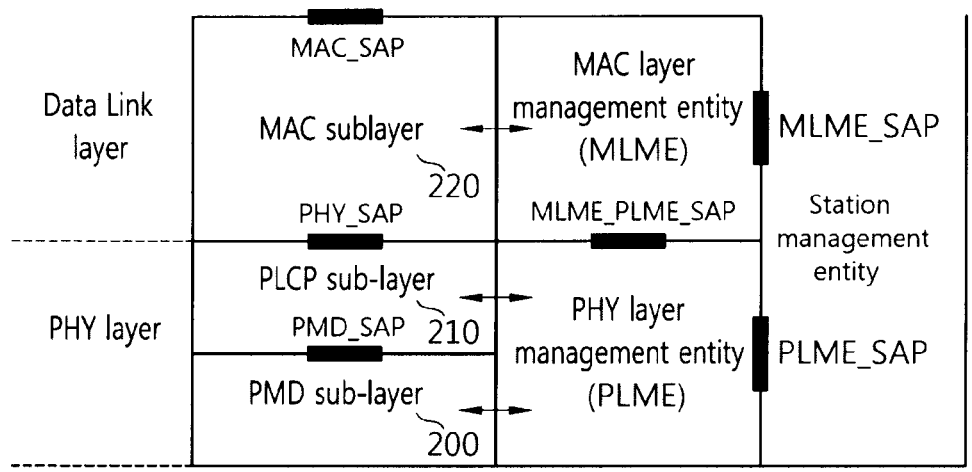
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sublayer 220. The PLCP sublayer 210 uses the information included in the TXVECTOR parameter in order to generate the PPDU including the PSDU.

The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIGS. 3 to 5.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Figure 3:
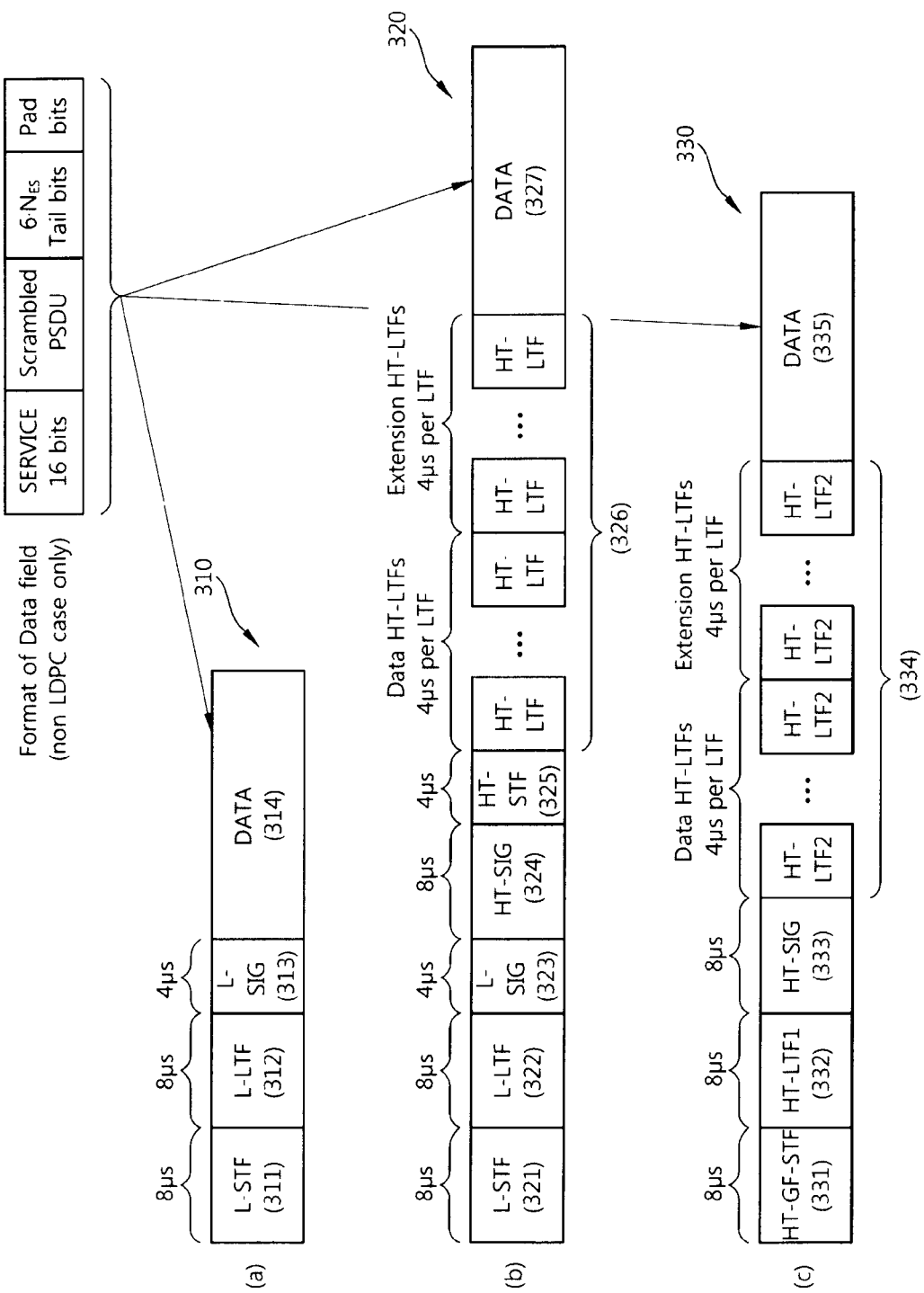
FIG. 3 illustrates various PPDU formats used by the conventional LAN system.
Figure 4:
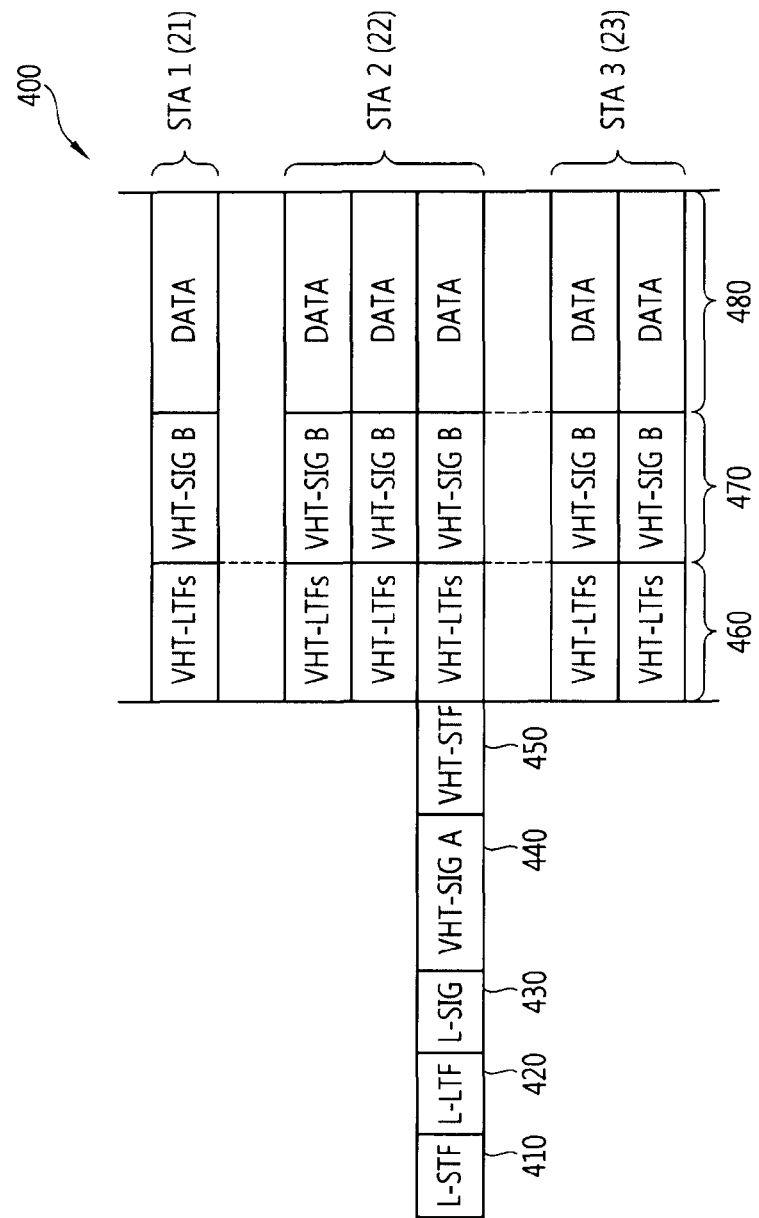
FIG. 4 shows an example of a PPDU format used in the WLAN system supporting very high throughput (VHT).

FIGS. 3 and 4 are block diagrams illustrating the format of the PPDU used in the wireless LAN system according to an embodiment of the present invention. Hereinafter, an STA that operates in a legacy wireless LAN system based on IEEE 802.11a/b/g that is an existing wireless LAN standard prior to IEEE 802.11n is referred to as a legacy STA (L-STA). In addition, an STA that may support high throughput (HT) in an HT wireless LAN system based on the IEEE 802.11n is referred to as an HT-STA.

The subfigure (a) of FIG. 3 illustrates the format of a legacy PPDU (L-PPDU) that is used in the IEEE 802.11a/b/g that is the existing wireless LAN system standard prior to the IEEE 802.11n. Therefore, in the HT wireless LAN system to which the IEEE 802.11n standard is applied, the L-STA may transmit and receive the L-PPDU having the above format.

Referring to the subfigure (a) of FIG. 3, an L-PPDU 310 includes an L-STF 411, an L-LTF 312, an L-SIG field 313, and a data field 314.

The L-STF 311 is used for frame timing acquisition, automatic gain control (AGC) convergence, coarse frequency acquisition, etc.

The L-LTF 312 is used for frequency offset and channel estimation.

The L-SIG field 313 includes control information for demodulation and decoding of the data field 314.

The L-PPDU may be transmitted in the order of the L-STF 311, the L-LTF 312, the L-SIG field 313, and the data field 314.

The subfigure (b) of FIG. 3 is a diagram showing an HT-mixed PPDU format in which an L-STA and an HT-STA can coexist. An HT-mixed PPDU 320 includes an L-STF 321, an L-LTF 322, an L-SIG field 323, an HT-SIG field 324, an HT-STF 325, a plurality of HT-LTF 326, and a data field 327.

The L-STF 321, the L-LTF 322, and the L-SIG field 323 are identical to those shown in the subfigure (a) of FIG. 3. Therefore, the L-STA can interpret the data field by using the L-STF 321, the L-LTF 322, and the L-SIG field 323 even if the HT-mixed PPDU 320 is received. The L-LTF 322 may further include information for channel estimation to be performed by the HT-STA in order to receive the HT-mixed PPDU 320 and to interpret the L-SIG field 323, the HT-SIG field 324, and the HT-STF 325.

The HT-STA can know that the HT-mixed PPDU 320 is a PPDU dedicated to the HT-STA by using the HT-SIG field 324 located next to the L-SIG field 323, and thus can demodulate and decode the data field 327.

The HT-STF 325 may be used for frame timing synchronization, AGC convergence, etc., for the HT-STA.

The HT-LTF 326 may be used for channel estimation for demodulation of the data field 327. Since the IEEE 802.11n supports single user-MIMO (SU-MIMO), a plurality of the HT-LTF 326 may be configured for channel estimation for each of data fields transmitted through a plurality of spatial streams.

The HT-LTF 326 may consist of a data HT-LTF used for channel estimation for a spatial stream and an extension HT-LTF additionally used for full channel sounding. Therefore, the number of the plurality of HT-LTF 326 may be equal to or greater than the number of spatial streams to be transmitted.

The L-STF 321, the L-LTF 322, and the L-SIG field 323 are transmitted first so that the L-STA also can acquire data by receiving the HT-mixed PPDU 320. Thereafter, the HT-SIG field 324 is transmitted for demodulation and decoding of data transmitted for the HT-STA.

Up to fields located before the HT-SIG field 324, transmission is performed without beamforming so that the L-STA and the HT-STA can acquire data by receiving a corresponding PPDU. In the subsequently fields, i.e., the HT-STF 325, the HT-LTF 326, and the data field 327, radio signal transmission is performed by using precoding. In this case, the HT-STF 325 is transmitted so that an STA that receives a precoded signal can consider a varying part caused by the precoding, and thereafter the plurality of HT-LTF 326 and the data field 327 are transmitted.

Even if an HT-STA that uses 20 MHz in an HT WLAN system uses 52 data subcarriers per OFDM symbol, an L-STA that also uses 20 MHz uses 48 data subcarriers per OFDM symbol. Since the HT-SIG field 324 is decoded by using the L-LTF 322 in a format of the HT-mixed PPDU 320 to support backward compatibility, the HT-SIG field 324 consists of 48×2 data subcarriers. The HT-STF 325 and the HT-LTF 326 consist of 52 data subcarriers per OFDM symbol. As a result, the HT-SIG field 324 is supported using ½ binary phase shift keying (BPSK), each HT-SIG field 424 consists of 24 bits, and thus 48 bits are transmitted in total. That is, channel estimation for the L-SIG field 323 and the HT-SIG field 324 is performed using the L-LTF 322, and a bit sequence constituting the L-LTF 322 can be expressed by Equation 1 below. The L-LTF 322 consists of 48 data subcarriers per one symbol, except for a DC subcarrier.

$$L_{-26,26} = \{1,1,-1,-1,1,1,-1,1,-1,1,1,1,1,1,1,-1,-1,1, \\ 1,-1,1,-1,1,1,1,1,0,1,-1,-1,1,1,-1,1,-1,1,-\\ 1,-1,-1,-1,1,1,-1,-1,1,-1,1,-1,1,1,1,1,1\} \quad \text{[Equation 1]}$$

The subfigure (c) of FIG. 3 is a diagram showing a format of an HT-Greenfield PPDU 330 that can be used by only an HT-STA. The HT-GF PPDU 330 includes an HT-GF-STF 331, an HT-LTF1 332, an HT-SIG field 333, a plurality of HT-LTF2 334, and a data field 335.

The HT-GF-STF 331 is used for frame timing acquisition and AGC.

The HT-LTF1 332 is used for channel estimation.

The HT-SIG field 333 is used for demodulation and decoding of the data field 335.

The HT-LTF2 334 is used for channel estimation for demodulation of the data field 335. Since the HT-STA uses SU-MIMO, channel estimation is required for each of data fields transmitted through a plurality of spatial streams, and thus a plurality of HT-LTF2 334 may be configured.

The plurality of HT-LTF2 334 may consist of a plurality of data HT-LTFs and a plurality of extension HT-LTFs, similarly to the HT-LTF 326 of the HT-mixed PPDU 320.

Data fields 314, 327, and 335 illustrated in FIG. (a), (b), and (c) may include a service field, a scrambled PLCP service data unit (PSDU), a tail bit, and a padding bit, respectively. The service field may be used for initializing a scrambler. The service field may be configured by 16 bits. In this case, bits for initializing the scrambler may be realized by 7 bits. The tail field may be configured by a bit sequence required for returning a convolution encoder to a zero state. A bit size proportional to the number of binary convolutional code (BCC) encoders used for encoding data to be transmitted may be allotted to the tail field. In detail, the tail field may be realized to have 6 bits by the number of BCCs.

FIG. 4 shows an example of a PPDU format used in the WLAN system supporting very high throughput (VHT).

Referring to FIG. 4, a PPDU 400 includes an L-STF 410, an L-LTF 420, an L-SIG field 430, a VHT-SIGA field 440, a VHT-STF 450, a VHT-LTF 460, a VHT-SIGB field 470, and a data field 480.

A PLCP sub-layer constituting a PHY converts a PSDU delivered from a MAC layer into the data field 480 by appending necessary information to the PSDU, generates the PPDU 400 by appending several fields such as the L-STF 410, the L-LTF 420, the L-SIG field 430, the VHT-SIGA field 440, the VHT-STF 450, the VHT-LTF 460, the VHT-SIGB field 470, or the like, to the data field and delivers the PPDU 400 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 410 is used for frame timing acquisition, automatic gain control (AGC) convergence, coarse frequency acquisition, etc.

The L-LTF 420 is used for channel estimation for demodulation of the L-SIG field 430 and the VHT-SIGA field 440.

The L-SIG field 430 is used when the L-STA receives the PPDU 400 and interprets it to acquire data. The L-SIG field 430 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 430 includes information related to the transmission time.

The VHT-SIGA field 440 includes control information (or signal information) required by STAs for receiving the PPDU to interpret the PPDU 400. The VHT-SIGA 440 is transmitted on two OFDM symbols. Accordingly, the VHT-SIGA field 440 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 400.

When the group ID indicates that the PPDU 400 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 400 is transmitted using the MU-MIMO transmission scheme, the VHT-SIGA field 400 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 470.

The VHT-STF 450 is used to improve performance of AGC estimation in MIMO transmission.

The VHT-LTF 460 is used when the STA estimates a MIMO channel. Since the next generation WLAN system supports MU-MIMO, the VHT-LTF 460 can be configured by the number of spatial streams in which the PPDU 400 is transmitted. In addition, when full channel sounding is supported and is performed, the number of VHT-LTFs may increase.

The VHT-SIGB field 470 includes dedicated control information required when the plurality of MIMO-paired STAs receive the PPDU 400 to acquire data. Therefore, the STA may be designed such that the VHT-SIGB field 470 is decoded only when the control information included in the VHT-SIGA field 440 indicates that the currently received PPDU 400 is transmitted using MU-MIMO transmission. On the contrary, the STA may be designed such that the VHT-SIGB field 470 is not decoded when the control information in the VHT-SIGA field 440 indicates that the currently received PPDU 400 is for a single STA (including SU-MIMO).

The VHT-SIGB field 470 may include MCS information and rate-matching information for each STA. Further, the VHT-SIGB field 470 may include information indicating a PSDU length included in the data field for each STA. The information indicating the PSDU length is information indicating a length of a bit-sequence of the PSDU and can be indicated in the unit of octet. Meanwhile, when the PPDU is transmitted based on single user transmission, the information about the MCS may not be included in the VHT-SIGB field 470, because that is included in the VHT-SIGA field 440. A size of the VHT-SIGB field 470 may differ according to the MIMO transmission method (MU-MIMO or SU-MIMO) and a channel bandwidth used for PPDU transmission.

The data field 480 includes data intended to be transmitted to the STA. The data field 480 includes a PLCP service data unit (PSDU) to which a MAC protocol data unit (MPDU) of a MAC layer is delivered, a service field for initializing a scrambler, a tail field including a bit sequence required to reset a convolution encoder to a zero state, and padding bits for normalizing a length of the data field. In case of MU transmission, each data unit intended to be respectively transmitted to each STA may be included in the data field 580. The data unit may be aggregate MPDU (A-MPDU).

The fields included in each PPDU format illustrated in FIGS. 3 and 4 can be transmitted as OFDM symbols after being processed in the physical layer. In particular, a data sequence comprising a data field can be transmitted as one or more OFDM symbols according to the size thereof. In addition, generation, transmission, reception, and interpretation of data OFDM symbols in a normal manner can be hindered by various causes such as radio channel state, inconsistency in time synchronization between a transmitter and a receiver, and interference among symbols. To prevent the hindrance from arising, a guard interval (GI) is applied to the data OFDM symbol; accordingly, an abnormal operation can be prevented and transmission and reception of data units can be carried out with high reliability. Moreover, in an HT and VHT wireless LAN system, an SGI, which is used to reduce time consumed by introducing a guard interval, is applied, thereby ensuring more efficient transmission and reception. The signal field and VHT-SIG A field in the HT and VHT wireless LAN system respectively indicates whether to apply the SGI or not.

Suppose an AP 10 attempts to transmit data to STA1 21, STA2 22, and STA3 23 in a wireless LAN system as shown in FIG. 1. PPDUs can then be transmitted to an STA group including STA1 21, STA2 22, STA3 23, and STA4 24. In this case, as shown in FIG. 4, transmission of PPDUs is carried out so that no spatial stream is allocated to the STA4 24 and data are transmitted by allocating a particular number of spatial streams to the STA1 21, STA2 22, and STA3 23, respectively. The example of FIG. 4 illustrates a case where one spatial stream is allocated to the STA1 21 while three spatial streams and two spatial streams are allocated to the STA2 22 and STA3 23, respectively.

Meanwhile, as various communication services such as smart grid, e-Health, and ubiquitous communication are now made available to the public, M2M (Machine to Machine) technology is getting much attention as enabling technology to support the aforementioned services. Various types of things can be converted to M2M system components: sensors sensing temperature and humidity, consumer products such as cameras and TVs, machines in a manufacturing process, and even large-scale machines such as cars, to mention a few. Afterwards in this document, when devices comprising an M2M system support WLAN and form a network among them, it is called an M2M WLAN system.

The following describe characteristics of a WLAN system which supports an M2M system.

1) A large number of STAs: unlike existing networks, an M2M system assumes existence of a large number of STAs within a BSS. This is so because not only personally owned devices but also sensors installed at places such as home and workplaces are taken into consideration. Therefore, it is highly possible that a considerable number of STAs are connected to one AP.

2) Low traffic load per STA: an M2M terminal collects and reports information of the surroundings. Thus it is not necessary for the M2M terminal to send the information frequently, and moreover, data rate of the information is relatively low.

3) Uplink-oriented communication: an M2M system is usually configured to receive command from downlink transmission, perform an appropriate action according to the command, and report any result from the action through uplink transmission. Since most of data are usually transmitted through uplink communication, uplink-oriented communication is a primary means supporting the M2M system.

4) Power management of STAs: M2M terminals usually operate based on batteries. Therefore it is difficult for users to charge the M2M terminals frequently. Therefore, a method for power management to minimize battery consumption is required.

5) Automatic recovery function: an automatic recovery function is needed since devices comprising an M2M system may not allow the human to perform direct operation thereof in a particular situation.

Today a next-generation wireless LAN system standard, which assumes the M2M communication as one of use cases, is under development. The wireless LAN system under consideration can be characterized by the fact that it can provide service coverage exceeding a radius of 1 km in the ISM band having a band of 1 GHz or less excluding the TV WS band, which means that the next-generation wireless LAN system is capable of providing service coverage significantly larger than that of the existing wireless LAN system operating indoors for the most part. In other words, unlike the existing 2.4 GHz and 5 GHz wireless LAN system, if a wireless LAN system is operated in a frequency band below 1 GHz, typified by the frequency band ranging from 700 to 900 MHz, the ratio of service coverage of an AP to the same transmission power can be enlarged approximately two or three times of that of the existing wireless LAN system due to propagation properties of radio waves in the corresponding frequency band. In this case, a significantly large number of STAs are enabled to connect to one AP in the next-generation wireless LAN system. The following are use-cases considered in the next-generation wireless LAN system.

Use case 1. Sensors and meters
1a: Smart grid—Meter to pole
1c: Environmental/Agricultural Monitoring
1d: Industrial process sensors
1e: Healthcare
1f: Healthcare
1g: Home/Building automation
1h: Home sensors
Use case 2. Backhaul sensor and meter data
Backhaul aggregation of sensors
Backhaul aggregation of industrial sensors
Use case 3. Extended range Wi-Fi
Outdoor extended range hotspot
Outdoor Wi-Fi for cellular traffic offloading The use case 1, employing sensors and meters, corresponds to the M2M usage example described above, where various types of sensors are connected to an AP of a wireless LAN system, performing M2M communication. In particular, in the case of smart grid, a maximum of 6000 sensors can be connected to one AP.

The use case 2, employing backhaul sensor and data meter, corresponds to the case where an AP providing broad coverage plays the role of backhaul link of a different communication system.

The use case 3 describes a case meant to provide outdoor extended range hotspot communication such as communication in extended home service coverage, campus-wide service coverage, and a shopping mall. The use case 3 also describes a case meant to disperse heavy-loaded cellular traffic as an AP supports traffic offloading of cellular mobile communication.

The present invention provides a format of a data unit meant for devices operating below 1 GHz frequency, which is being discussed in the next-generation wireless LAN standard. More specifically, the present invention provides a structure of an effective physical layer preamble for devices operating below 1 GHz. Data units provided in what follows, namely PPDUs, can be transmitted sequentially in the form of OFDM symbols according to an inclusion order of fields.

Due to the nature of a radio wave, communication below 1 GHz frequency can be carried out with significantly large service coverage compared with that provided by an existing wireless LAN system oriented to indoor environments. The communication with extended service coverage can be implemented by 1/10 down-clocking of the physical layer (PHY) of the existing VHT wireless LAN system. In this case, 20/40/80/160/80+80 MHz channel bandwidth defined for the VHT wireless LAN system is reduced to 2/4/8/16/8+8 MHz channel bandwidth having a band of 1 GHz or less through the 1/10 down-clocking. Accordingly, the guard interval (GI) is increased ten times from the original 0.8 µs to 8 µs. The Table 2 below shows performance comparison between the physical layer of the VHT wireless LAN system and the physical layer of a wireless LAN system based on 1/10 down-clocked band below 1 GHz.

TABLE 2

| VHT wireless LAN system PHY | | Wireless LAN system PHY based on 1/10 down-clocked band below 1 GHz | |
|---|---|---|---|
| Channel bandwidth | Throughput | Channel bandwidth | Throughput |
| 20 MHz | 86.7 Mbps | 20 MHz | 8.67 Mbps |
| 40 MHz | 200 Mbps | 40 MHz | 20 Mbps |
| 80 MHz | 433.3 Mbps | 80 MHz | 43.33 Mbps |
| 160 MHz | 866.7 Mbps | 160 MHz | 86.67 Mbps |
| 80 + 80 MHz | 866.6 Mbps | 80 + 80 MHz | 86.66 Mbps |

In what follows, for the convenience of description, it is assumed that 1/10 down-clocking is applied to the PHY of the VHT wireless LAN system, and OFDM 1 symbol duration is 40 µs. However, it should be noted that the technical scope according to the embodiments of the present invention is not limited to the aforementioned numerical value.

Since there is no legacy devices operating in the frequency band below 1 GHz, which have been considered in the existing wireless LAN system, it is more important to design the PHY preamble to be effective below 1 GHz frequency band as much as possible without necessarily considering backward compatibility. Taking account of this fact, the present invention proposes a PPDU format such as shown in FIG. 5.

Figure 5:
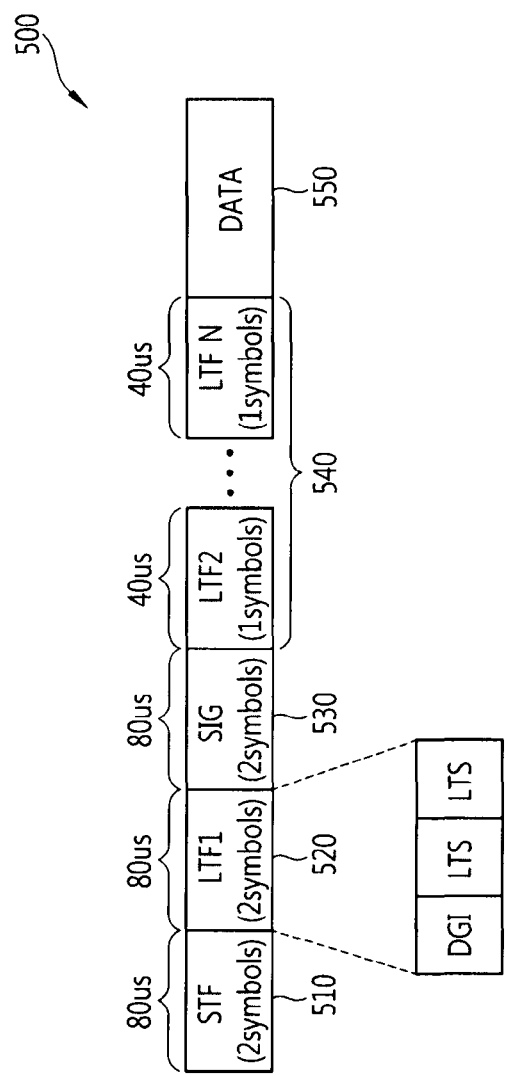
FIG. 5 is a block diagram illustrating one example of a PPDU format meant for transmission through frequency band below 1 GHz according to an embodiment of the present invention.

FIG. 5 is a block diagram illustrating one example of a PPDU format meant for transmission through frequency band below 1 GHz according to an embodiment of the present invention.

With reference to FIG. 5, the PPDU 500 has a structure obtained by 1/10 down-clocking of the HT-GF PPDU format such as shown in FIG. 3(c). The PPDU 500 includes STF 510, LTF1 520, SIG field 530, at least one LTF2 540, and data field 550.

The STF 510 is used for frame timing acquisition and AGC. The STF 510 consists of two OFDM symbols, each of which has OFDM symbol duration of 40 µs, amounting to 80 µs in total.

The LTF1 520 is used for channel estimation. The LTF1 520 consists of two OFDM symbols, each of which has OFDM symbol duration of 40 µs, amounting to 80 µs in total. The LTF1 520 includes Double Guard Interval (DGI) and two Long Training Symbols (LTSs).

The SIG field 530 is used for demodulation and decoding of the data field 540. The SIG field 530 consists of two OFDM symbols, each of which has OFDM symbol duration of 40 µs, amounting to 80 µs in total.

At least one LTF 540 is used for channel estimation meant for demodulation of the data field 550. Each LTF comprises one OFDM symbol and has OFDM symbol duration of 40 µs.

In the case of transmitting a PPDU having the format of FIG. 5, a total of 160 µs is required until the SIG field 530 is transmitted. The PPDU adopting the aforementioned format can be used for transmission of channel bandwidth larger than 2 MHz.

Figure 6:
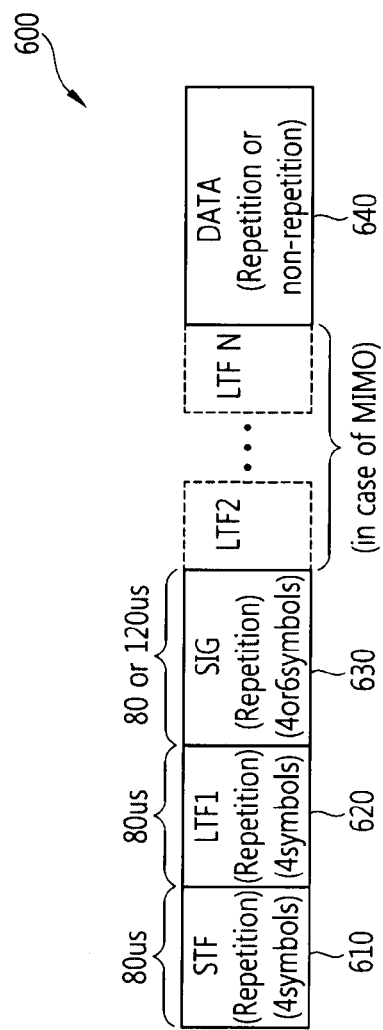
FIG. 6 is a block diagram illustrating one example of a PPDU format meant for 1 MHz transmission in the frequency band below 1 GHz according to an embodiment of the present invention.

Meanwhile, to perform communication of extended coverage, a PPDU format as shown in FIG. 6 can be employed, where the STF, LTF, and/or data fields included in a PPDU having the format of FIG. 5 is repeated along the time or frequency axis for more than two times the original duration.

FIG. 6 is a block diagram illustrating one example of a PPDU format meant for 1 MHz transmission in the frequency band below 1 GHz according to an embodiment of the present invention.

With reference to FIG. 6, the PPDU 600 can include STF 610, LTF1 620, SIG field 630, and data field 640. In the case of a PPDU meant for MIMO transmission, at least one or more LTFs (LTF2 to LTFN) can be further included according to the number of employed spatial streams.

Referring to the STF 610 and LTF1 620, it can be noticed that OFDM symbols are formed being repeated one after another compared with the STF 510 and LTF1 520 of FIG. 5. In other words, the OFDM symbol(s) comprising bit sequences constituting the original STF and LTF1 is repeated one after another.

Therefore, the STF 610 comprises four OFDM symbols, each of which lasts 40 µs, amounting to OFDM symbol duration of 160 µs in total. The LTF1 620 also comprises four OFDM symbols, each of which lasts 40 µs, amounting to OFDM symbol duration of 160 µs. In other words, in case a PPDU adopting the format of FIG. 6, a time required for transmission of preamble becomes 320 µs, consuming two times the time for transmitting a PPDU adopting the format of FIG. 5.

The SIG field 630 can also be built in the form of repetition of OFDM symbols, which is formed by repetition thereof more than two times.

Meanwhile, the data field 640 may or may not allow repetition of the OFDM symbol. By implementing a particular indication field within the SIG field 630, whether repetition of the OFDM symbol is applied in the data field 640 can be known. The particular indication field can be implemented by a Modulation and Coding Scheme (MCS) sub-field indicating an MCS applied to the data field 640. In case the MCS sub-field indicates that an MCS of the lowest level has been applied to the data field, the OFDM symbol can be applied to the data field 640 repeatedly.

The PPDU format to which repetition of the OFDM symbol has been applied as shown in FIG. 6 can be used for frame transmission and reception adapted for extended service coverage by using a 1 MHz channel bandwidth.

In an HT-GF PPDU, which is a base for the PPDU format as described in FIG. 6, in case the number of spatial streams is 1, namely, in the case of transmission of a single stream to which MIMO transmission is not applied, use of SGI is prohibited. This is so because, even if the SIG field indicates use of the SGI, application of the SGI to the data field symbols starting from the very first one transmitted subsequent to the SIG field can cause a burden in terms of data processing complexity due to decoding delay of the SIG field itself.

In a wireless communication environment, including sensor applications, to which the next-generation wireless LAN system is applied, it is expected that most of traffic is related to single user single stream transmission. In such an environment, prohibiting the SGI from being used in the data field can cause a loss in terms of throughput.

In a new PPDU format constructed by applying 1/10 down-clocking to the PPDU format provided in an existing wireless LAN system as shown in FIGS. 5 and 6, actual duration of a short GI is 4 μs, which is considerably longer than typical indoor channel multipath delay. Also, sufficient time can be secured for the GI even in outdoor environments, if such environments, exhibiting significant multipath delay, are excluded. Therefore, even in the case of transmission of a single stream, it is more effective to allow application of the SGI to the data symbol.

Figure 7:
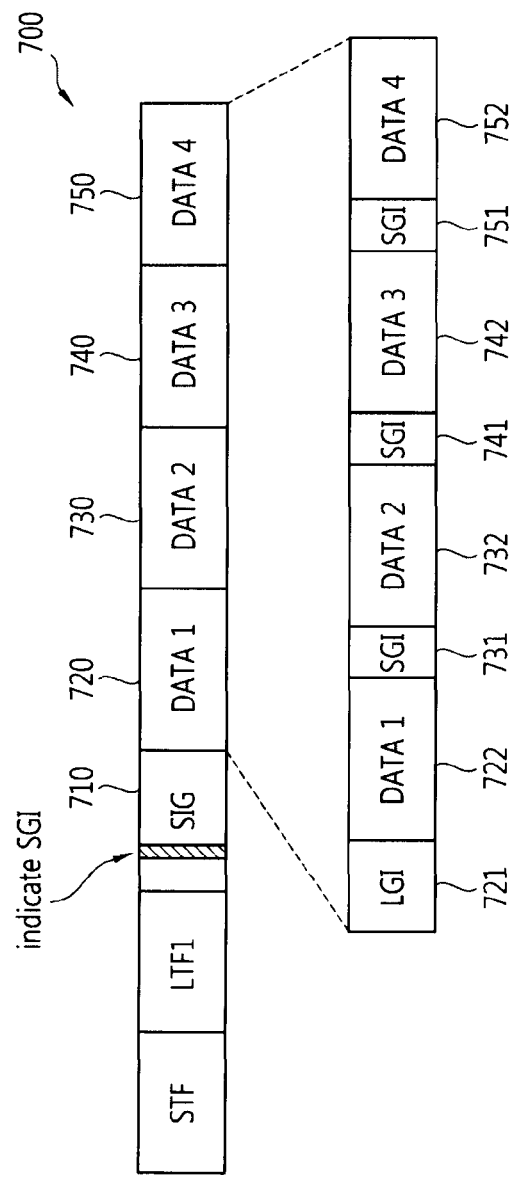
FIG. 7 is a block diagram illustrating another example of a PPDU format according to an embodiment of the present invention.

FIG. 7 is a block diagram illustrating another example of a PPDU format according to an embodiment of the present invention.

The PPDU 700 of FIG. 7 is used for transmission of a single stream by using 2/4/8/16/8+8 MHz channel bandwidth in the next-generation wireless LAN system.

With reference to FIG. 7, the PPDU 700 includes STF, LTF1, SIG field 710, data field 1 720, data field 2 730, data field 3 740, and data field 4 750. The present embodiment assumes that the number of data fields is four; however, the assumption is just an example, and one or more data fields can be employed.

The SIG field 710 includes information indicating that a short GI can be used for the data field.

The GI is applied to each of data field OFDM symbols. The OFDM symbol of data field 1 720 adopts a long GI (LGI) 721 and includes data 1 722 (in what follows, the LGI represents an ordinary GI differently from the SGI). The OFDM symbols of the data field 2 730, data field 3 740, and data field 4 750 include SGIs 731, 741, 751 and the corresponding data 732, 742, 752, respectively.

According to FIG. 7, in case application of the SGI to the SIG field is indicated, LGI is applied to the first data OFDM symbol subsequent to the SIG field, but SGI is applied to the data OFDM symbols afterwards.

Figure 8:
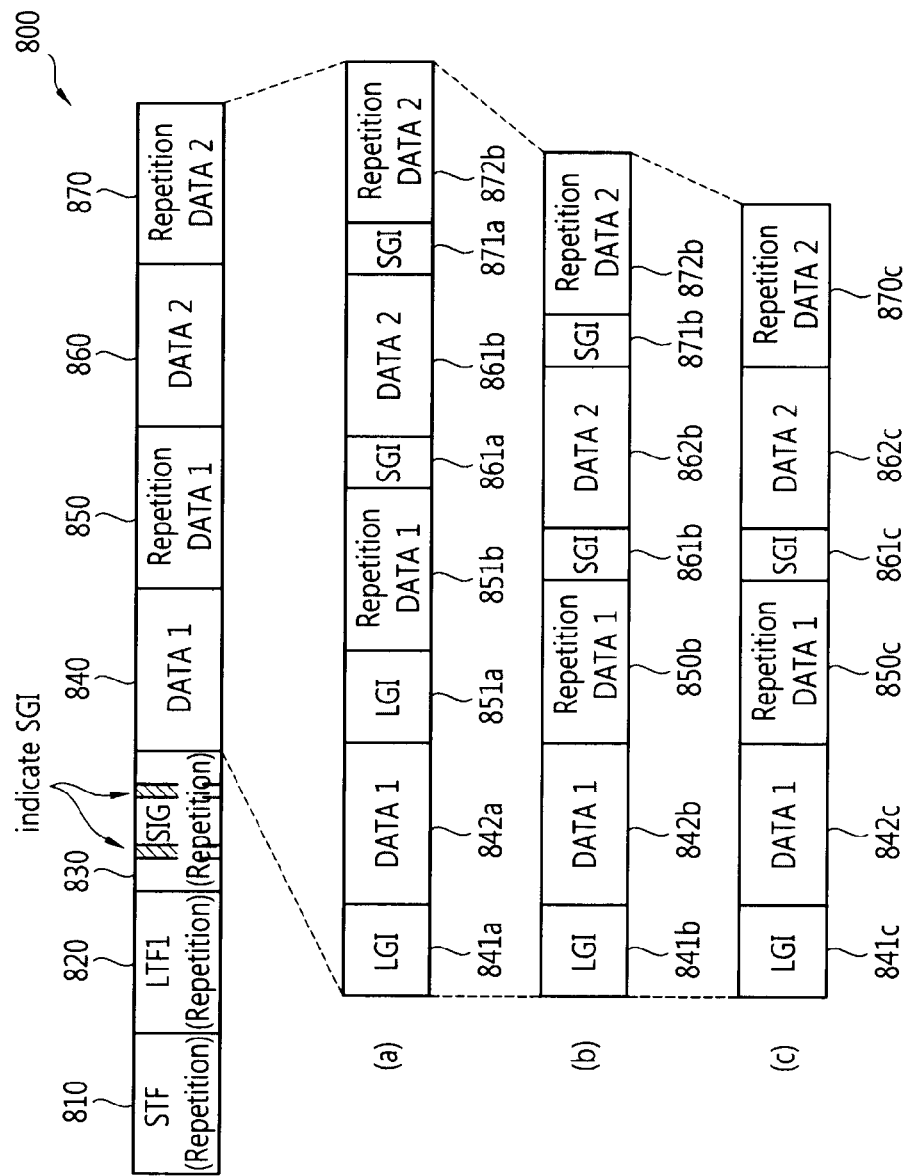
FIG. 8 is a block diagram illustrating a yet another example of a PPDU format according to an embodiment of the present invention.

FIG. 8 is a block diagram illustrating a yet another example of a PPDU format according to an embodiment of the present invention.

The PPDU of FIG. 8 corresponds to a PPDU format used for transmission of a single stream through a 1 MHz channel bandwidth in the next-generation wireless LAN system.

Referring to FIG. 8, the PPDU 800 includes repeated STF 810, repeated LTF1 820, repeated SIG field 830, and at least one or more data fields. The PPDU shown in the figure is characterized in that OFDM symbols are repeated. In other words, the repeated STF 810, repeated LTF1 820, and repeated SIG field 830 are formed as an OFDM symbol(s) made of bit sequences constituting the original STF, LTF1, and SIG field is formed repeatedly similar to the STF 610, LTF1 620, and SIG field 630 of FIG. 6. The STF and LTF1 consist of four OFDM symbols respectively as two OFDM symbols constituting the original STF and LTF1 respectively are repeated to form the four OFDM symbols. The repeated SIG field is also formed as OFDM symbols constituting the original SIG field are repeated.

The PPDU 800 includes a repetition data field formed as at least one data field and the corresponding data field are repeated. The PPDU 800 includes data field 1 840, repetition data field 1 850, data field 2 860, and repetition data field 2 870.

Meanwhile, LGI is applied to the data field 1 840 and repetition data field 1 850, which are the first data OFDM symbol and the second data OFDM symbol transmitted subsequent to the repeated SIG field 810, respectively. SGI is applied to the OFDM symbols transmitted subsequent thereto, namely, data field 2 860 and repetition data field 2 870. The PPDU format illustrating the above structure is shown in FIG. 8(*a*).

With reference to FIG. 8(*a*), the OFDM symbol of the data field 1 840 employs LGI 841*a* and includes the data 1 842*a*. The OFDM symbol of the repetition data field 1 850, too, employs LTI 851*a* and includes the repetition data 1 852*a*.

The OFDM symbol of the data field 2 860 employs SGI 861*a* and includes data 2 862*a*. The OFDM symbol of the repetition data field 2 870 employs SGI 871*a* and includes the repetition data 2 872*a*.

According to the PPDU format of FIG. 8(*a*), OFDM symbols of the data field 1 840 and the repetition data field 1 850, which is a repeated version of the data field 1, can be created to be the same to each other; therefore, by inserting LGI to both of the OFDM symbols, the same process can be used to create the two OFDM symbols. Subsequently, SGI can be inserted constantly to the data field 2 860, which is the third data OFDM symbol, and the repetition data field 2 870, which is the fourth OFDM symbol.

Meanwhile, a PPDU format which does not employ LGI can be applied to the OFDM symbol of the repetition data field 1 850, which is the second data OFDM symbol. In other words, since LGI 841*a* is applied to the OFDM symbol of the data field 1 840, which is the first data OFDM symbol, the second data OFDM symbol does not necessarily require LGI but may share the LGI 841*a* of the previous OFDM symbol. Similarly, SGI can be applied the same to the OFDM symbols for the fields after the data field 2 860, which is the third data OFDM symbol. The PPDU format illustrating the structure above is shown in FIG. 8(*b*).

With reference to FIG. 8(*b*), the OFDM symbol of the data field 1 840 employs LGI 841*b* and includes data 1 842*b*. The OFDM symbol of the repetition data field 1 850 does not employ LGI, but includes the repetition data 1 850*b*.

The OFDM symbol of the data field 2 860 employs SGI 861*b* and includes data 2 862*b*. The OFDM symbol of the repetition data field 2 870 employs SGI 871*b* and includes the repetition data 2 872*b*.

According to the PPDU format of FIG. 8(*b*), the first and the second OFDM symbol and the third and the fourth data OFDM symbol have the same length, and time overhead as long as the LGI can be reduced compared with the existing PPDU format of FIG. 8(*a*). Also, OFDM symbols about data fields are transmitted by two symbols at predetermined time intervals.

Also, the PPDU format not employing SGI can be applied to the second repetition data OFDM symbol to which the existing SGI has been applied. In other words, SGI is not applied to OFDM symbols if they are repeated OFDM symbols. The PPDU format illustrating the above structure is shown in FIG. 8(c).

With reference to FIG. 8(c), the OFDM symbol of the data field 1 840 employs LGI 841c and includes data 1 842c. The OFDM symbol of the repetition data field 1 850 does not employ LGI, but includes the repetition data 1 850b.

The OFDM symbol of the data field 2 860 employs SGI 861c and includes data 2 862c. The OFDM symbol of the repetition data field 2 870 does not employ SGI, but includes the repetition data 2 870c.

According to the PPDU format of FIG. 8(c), length for the first and the second data OFDM symbol is set different from the length for the third and the fourth symbol; however, the PPDU format of FIG. 8(c) is advantageous in that time overhead can be reduced most.

In what follows, described will be a method for constructing a pilot subcarrier in a PPDU format intended for the aforementioned 1 MHz transmission.

In an existing VHT wireless LAN system, a pilot subcarrier is constructed as follows.

1) 20 MHz transmission

Four pilot tones can be inserted at −21, −7, 7, and 21 subcarrier index positions. $P_n^k$, which represents pilot mapping of the k-th subcarrier in the n-th symbol, can be expressed by equation 2.

$$P_n^{\{-21,-7,7,21\}} = \{\Psi_{1,n \bmod 4}^{(1)}, \Psi_{1,(n+1) \bmod 4}^{(1)}, \Psi_{1,(n+2) \bmod 4}^{(1)}, \Psi_{1,(n+3) \bmod 4}^{(1)}\}$$
$$P_n^{k \notin \{-21,-7,7,21\}} = 0 \quad \text{[Equation 2]}$$

where $\Psi_{1,m}^{(1)}$ can be defined as shown in Table 3.

TABLE 3

| $\Psi_{1,0}^{(1)}$ | $\Psi_{1,1}^{(1)}$ | $\Psi_{1,2}^{(1)}$ | $\Psi_{1,3}^{(1)}$ |
|---|---|---|---|
| 1 | 1 | 1 | −1 |

2) 40 MHz transmission

Six pilot tones can be inserted at −53, −25, −11, 11, 25, and 53 subcarrier index positions. $P_n^k$, which represents pilot mapping of the k-th subcarrier in the n-th symbol, can be expressed by equation 3.

$$P_n^{\{-53,-25,-11,11,25,53\}} = \{\Psi_{1,n \bmod 6}^{(1)}, \Psi_{1,(n+1) \bmod 6}^{(1)}, \cdots, \Psi_{1,(n+5) \bmod 6}^{(1)}\}$$
$$P_n^{k \notin \{-53,-25,-11,11,25,53\}} = 0 \quad \text{[Equation 3]}$$

where $\Psi_{1,m}^{(1)}$ can be defined as shown in Table 4.

TABLE 4

| $\Psi_{1,0}^{(1)}$ | $\Psi_{1,1}^{(1)}$ | $\Psi_{1,2}^{(1)}$ | $\Psi_{1,3}^{(1)}$ | $\Psi_{1,4}^{(1)}$ | $\Psi_{1,5}^{(1)}$ |
|---|---|---|---|---|---|
| 1 | 1 | 1 | −1 | −1 | 1 |

3) 80 MHz transmission

Eight pilot tones can be inserted at −103, −75, −39, −11, 11, 39, 75, and 103 subcarrier index positions. $P_n^k$, which represents pilot mapping of the k-th subcarrier in the n-th symbol, can be expressed by equation 4.

$$P_n^{\{-103,-75,-39,-11,11,39,75,103\}} = \{\Psi_{1,n \bmod 8}, \Psi_{1,(n+1) \bmod 8}, \cdots, \Psi_{1,(n+7) \bmod 8}\}$$
$$P_n^{k \notin \{-103,-75,-39,-11,11,39,75,103\}} = 0 \quad \text{[Equation 4]}$$

where $\Psi_m$ can be defined as shown in Table 5.

TABLE 5

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

4) 160 MHz transmission

Implementation of 160 MHz pilot mapping assumes that pilot mapping of 80 MHz is duplicated to two 80 MHz sub-bands of 160 MHz transmission. More specifically, sixteen pilot tones can be inserted at −231, −203, −167, −139, −117, −89, −53, −25, 25, 53, 89, 117, 139, 167, 203, and 231 subcarrier index positions. $P_n^k$, which represents pilot mapping of the k-th subcarrier in the n-th symbol, can be expressed by equation 5.

$$P_n^{\{-231,-203,-167,-139,-117,-89,-53,-25,25,53,89,117,139,167,203,231\}} =$$
$$\{\Psi_{n \bmod 8}, \Psi_{(n+1) \bmod 8}, \Psi_{(n+2) \bmod 8}, \Psi_{(n+3) \bmod 8}, \Psi_{(n+4) \bmod 8}, \Psi_{(n+5) \bmod 8},$$
$$\Psi_{(n+6) \bmod 8}, \Psi_{(n+7) \bmod 8}, \Psi_{n \bmod 8}, \Psi_{(n+1) \bmod 8}, \Psi_{(n+2) \bmod 8},$$
$$\Psi_{(n+3) \bmod 8}, \Psi_{(n+4) \bmod 8}, \Psi_{(n+5) \bmod 8}, \Psi_{(n+6) \bmod 8}, \Psi_{(n+7) \bmod 8}\}$$
$$P_n^{k \notin \{-231,-203,-167,-139,-117,-89,-53,-25,25,53,89,117,139,167,203,231\}} = 0$$

[Equation 5]

where $\Psi_m$ can be defined as shown in Table 5 above.

The method for constructing pilot subcarriers in the VHT wireless LAN system can be applied the same to 2/4/8/16 MHz transmission of the next-generation wireless LAN system based on frequency band below 1 GHz characterized by 1/10 down-clocking. On the other hand, since 32 pilot tones are used for 1 MHz transmission, only 2 tones out of the 32 tones can be considered for pilot subcarriers. In this case, it is not possible to construct pilot subcarriers for a VHT wireless LAN system by using down-clocking only. Therefore, the present invention provides a method for constructing pilot subcarriers relevant to 1 MHz transmission which uses only two pilot tones as described below.

In the case of 1 MHz transmission, two pilot tones can be inserted at −7 and 7 subcarrier index positions. $P_n^k$, which represents pilot mapping of the k-th subcarrier in the n-th symbol, can be expressed by equation 6.

$$P_n^{\{-7,7\}} = \{\Psi_{n \bmod 2}, \Psi_{(n+1) \bmod 2}\}$$
$$P_n^k = 0, \text{ for } k \neq -7 \text{ and } k \neq 7 \quad \text{[Equation 6]}$$

where $\Psi_m$ can be defined as shown in Table 6.

TABLE 6

| $\Psi_0$ | $\Psi_1$ |
|---|---|
| 1 | −1 |

If the method above is applied, pilot mapping is implemented so that 1 and −1 are inverted in turn for each OFDM symbol at −7 and 7 pilot index positions. Also, the method above enables low-complexity phase tracking as it employs single-stream pilot values rather than different pilot subcarriers for the respective multi-streams in an HT wireless LAN system.

FIG. 9 is related to a case where the method for constructing pilot subcarriers described above is applied to OFDM symbols intended for a PPDU format for 1 MHz transmission.

FIG. 9 illustrates a pilot sequence according to OFDM symbols according to an embodiment of the present invention.

With reference to FIG. 9, since the corresponding OFDM symbol is a data OFDM symbol meant for 1 MHz PPDU transmission, pilots can be inserted at −7 and 7 subcarrier index positions. Meanwhile, a pilot value can be changed according to the order of the corresponding OFDM symbol, namely, according to the index n of the corresponding OFDM symbol.

The subfigure (a) of FIG. 9 shows a pilot sequence according to the OFDM symbol in case repetition of OFDM symbol is applied.

With reference to the subfigure (a) of FIG. 9(a), in the case of a first data symbol (n=0), a pilot 910a positioned at subcarrier index −7 has a value of +1 while the pilot 920a positioned at subcarrier index 7 has a value of −1. On the other hand, in the case of a first repetition data symbol (n=1), the pilot 910a positioned at subcarrier index −7 has a value of −1 while the pilot 920a positioned at subcarrier index 7 has a value of +1. Also, in the case of a second repetition data symbol (n=2), the pilot 910a positioned at subcarrier index −7 has a value of +1 while the pilot 920a positioned at subcarrier index 7 has a value of −1. Similarly, in the case of a second repetition data symbol (n=3), the pilot 910a positioned at subcarrier index −7 has a value of −1 while the pilot 920a positioned at subcarrier index 7 has a value of +1.

The subfigure (b) of FIG. 9 illustrates a pilot sequence according to an OFDM symbol in case repetition of OFDM symbol is not employed.

With reference to the subfigure (a) of FIG. 9, in the case of a first data symbol (n=0), a pilot 910b positioned at subcarrier index −7 has a value of +1 while the pilot 920b positioned at subcarrier index 7 has a value of −1. On the other hand, in the case of a second data symbol (n=1), the pilot 910b positioned at subcarrier index −7 has a value of −1 while the pilot 920b positioned at subcarrier index 7 has a value of +1. Also, in the case of a third data symbol (n=2), the pilot 910b positioned at subcarrier index −7 has a value of +1 while the pilot 920b positioned at subcarrier index 7 has a value of −1. Similarly, in the case of a fourth data symbol (n=3), the pilot 910b positioned at subcarrier index −7 has a value of −1 while the pilot 920b positioned at subcarrier index 7 has a value of +1.

In what follows, described will be a PPDU format meant for transmission of a plurality of spatial streams, where 1 MHz frequency band is employed.

Figure 10:
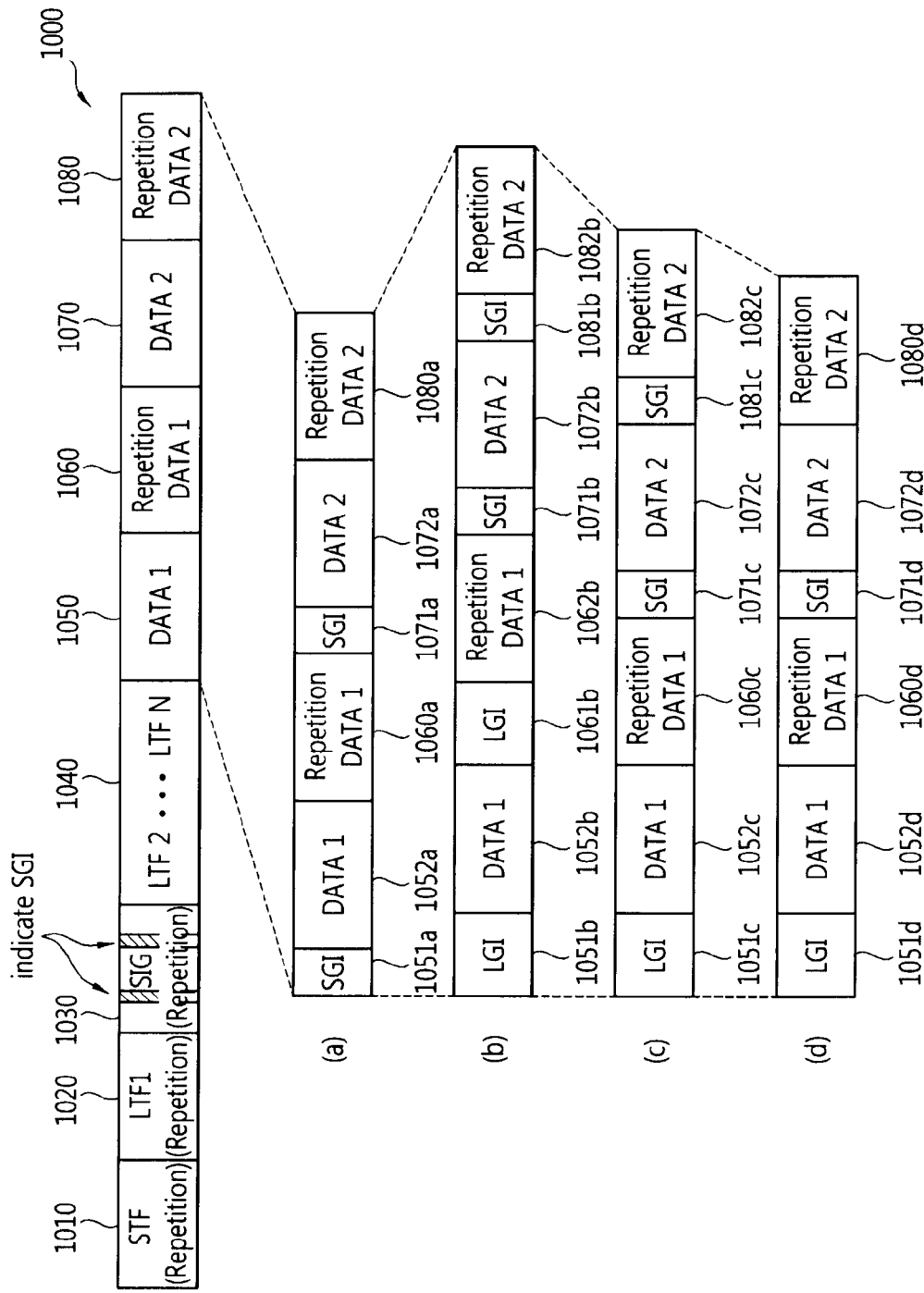
FIG. 10 is a block diagram illustrating one example of a PPDU format meant for 1 MHz transmission in the frequency band below 1 GHz according to another embodiment of the present invention.

FIG. 10 is a block diagram illustrating one example of a PPDU format meant for 1 MHz transmission in the frequency band below 1 GHz according to another embodiment of the present invention.

The PPDU shown in FIG. 10 illustrates a PPDU format used for multi-stream transmission through 1 MHz channel bandwidth in the next generation WLAN system.

With reference to FIG. 10, the PPDU 1000 includes a repeated STF 1010, repeated LTF1 1020, repeated SIG field 1030, at least one LTF 1040, and at least one or more data fields.

The PPDU shown in the figure is characterized in that OFDM symbols are repeated. In other words, the repeated STF 1010, repeated LTF1 1020, and repeated SIG field 1030 are formed as an OFDM symbol(s) made of bit sequences constituting the original STF, LTF1, and SIG field is formed repeatedly similar to the STF 610, LTF1 620, and SIG field 630 of FIG. 6. The STF and LTF1 consist of four OFDM symbols respectively as two OFDM symbols constituting the original STF and LTF1 respectively are repeated to form the four OFDM symbols. The repeated SIG field is also formed as OFDM symbols constituting the original SIG field are repeated.

Meanwhile, a PPDU format meant for transmission of multi-streams is constructed so that at least one LTF 1040 for MIMO channel estimation is transmitted after transmission of a repeated SIG field 1030, and at least one data field is transmitted afterwards. Therefore, in case application of SGI is indicated in the SIG field, sufficient time to implement the indication in the data field can be secured. Therefore, it is possible to apply SGI to the first data OFDM symbol. Also, application of SIG to a repeated OFDM symbol can be skipped. The PPDU format according thereto is shown in FIG. 10(a).

With reference to the subfigure (a) of FIG. 10, the OFDM symbol of a data field 1 1050 employs SGI 1051a and includes data 1 1052a. The OFDM symbol of a repeated data field 1 1060 employs SGI and includes a repeated data 1 1060a.

The OFDM symbol of a data field 2 1070 employs SGI 1071a and includes data 2 1072a. The OFDM symbol of a repeated data field 1 1080 does not apply SGI but includes a repeated data 2 1080a.

The PPDU format as shown in the subfigure (a) of FIG. 10 reduces time overhead.

Meanwhile, in the case of multi-stream transmission, too, LGI can be employed for a first data OFDM symbol transmitted subsequent to LTFs. In this case, LGI can be applied to the first data OFDM symbol regardless of a case where the PPDU is transmitted through a single spatial stream or a case where the PPDU is transmitted through a plurality of spatial streams with respect to 1 MHz transmission. This is so because, if application of SGI is limited to single stream transmission, a procedure for creating the PPDU is varied according to the number of spatial streams, and complexity is thus increased in view of implementation. In other words, in case application of SGI is indicated in the SIG field by taking account of advantages in terms of implementation regardless of the number of spatial streams for PPDU transmission, a PPDU format can be proposed, which employs LGI for the first data OFDM symbol. The PPDU format according thereto is shown in subfigures (b)-9d) of FIG. 10.

With reference to the subfigure (b) of FIG. 10, the OFDM symbol of a data field 1 1050 employs LGI 1051b and includes data 1 1052b. Also, the OFDM symbol of a repetition data filed 1 1060 employs LGI 1061b and includes a repetition data 1 1062b.

The OFDM symbol of a data field 2 1070 employs SGI 1071b and includes data 2 1072b. The OFDM symbol of a repetition data filed 2 1080 employs SGI 1081b and includes a repetition data 2 1082b.

With reference to the subfigure (c) of FIG. 10, the OFDM symbol of a data field 1 1050 employs LGI 1051c and includes data 1 1052c. The OFDM symbol of a repetition data filed 1 1060 does not employ LGI, but includes a repetition data 1 1060c.

The OFDM symbol of a data field 2 1070 employs SGI 1071c and includes data 2 1072c. The OFDM symbol of a repetition data filed 2 1080 employs SGI 1081c and includes a repetition data 2 1082c.

With reference to the subfigure (d) of FIG. 10, the OFDM symbol of a data field 1 1050 employs LGI 1051d and includes data 1 1052d. The OFDM symbol of a repetition data filed 1 1060 does not employ LGI, but includes a repetition data 1 1060d.

The OFDM symbol of a data field 2 1070 employs SGI 1071d and includes data 2 1072d. The OFDM symbol of a repetition data filed 2 1080 does not employs SGI, but includes a repetition data 2 1082d.

The aforementioned PPDU format which employs LGI for the first data OFDM symbol can also be applied to the case of transmitting the PPDU through a plurality of spatial streams by using 2 MHz channel band, which will be described with respect to FIG. 11.

Figure 11:
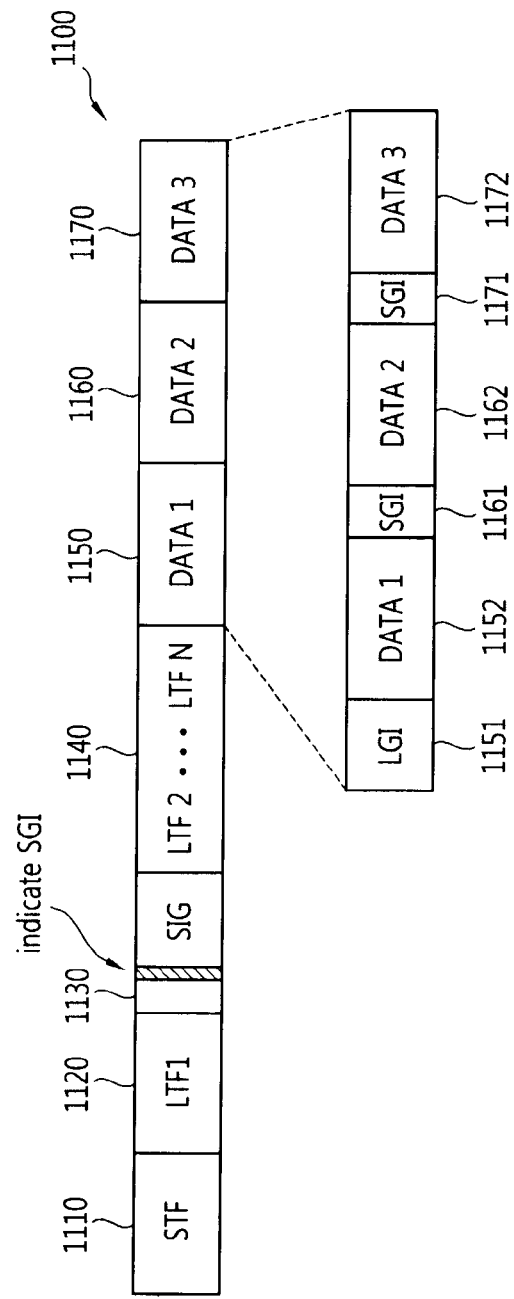
FIG. 11 is a block diagram illustrating another example of a PPDU format for transmission through frequency band below 1 GHz according to another embodiment of the present invention.

FIG. 11 is a block diagram illustrating another example of a PPDU format for transmission through frequency band below 1 GHz according to another embodiment of the present invention.

With reference to FIG. 11, the PPDU 1100 includes STF 1110, LTF1 1120, SIG field 1130, at least one LTF 1140, data field 1 1150, data field 2 1160, and data field 3 1170. The present embodiment assumes that the number of data fields is three; however, the assumption is just an example, and one or more data fields can be employed.

The SIG field 1130 includes information indicating that a short GI can be used for the data field.

The GI is applied to each of data field OFDM symbols. The OFDM symbol of data field 1 1150 adopts LGI 1152 and includes data 1 1152. The OFDM symbols of the data field 2 1160 and data field 3 1170 include SGIs 1161, 1171 and the corresponding data 1162, 1172, respectively.

Meanwhile, in a PPDU format according to an embodiment of the present invention, which has been described with reference to appended drawings, each field can be transmitted through at least one OFDM symbol. Also, each field can be transmitted sequentially according to the order at which the field is included in the PPDU.

Figure 12:
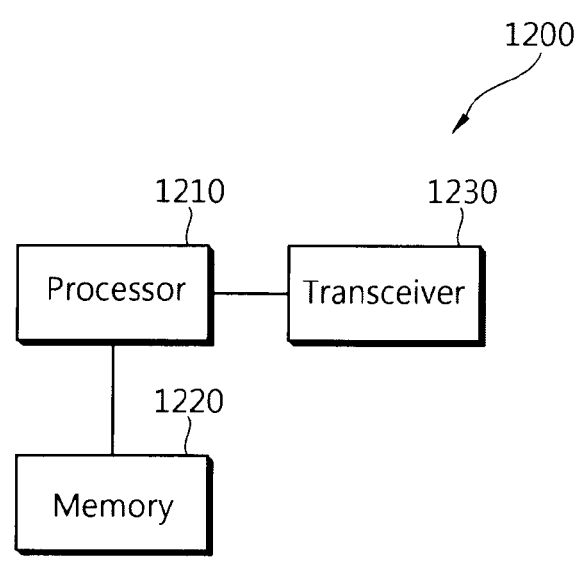
FIG. 12 is a block diagram illustrating a wireless apparatus in which an embodiment of the present invention can be implemented.

FIG. 12 is a block diagram illustrating a wireless apparatus in which an embodiment of the present invention can be implemented.

With reference to FIG. 12, a wireless apparatus 1200 comprises a processor 1210, memory 1220, and transceiver 1230. The transceiver 1230 transmits and/or receives a radio signal and implements a physical layer of the IEEE 802.11. The processor 1210 can be configured to operate being connected functionally to the transceiver 1230. The processor 1210 can be configured to create and transmit PPDUs having the format proposed in the embodiments of the present invention. The processor 1210, in the case of transmitting 1 MHz PPDU, can be configured to transmit the PPDU by inserting a pilot tone into the OFDM symbol as shown in FIG. 9. The processor 1210 can be configured to implement embodiments of the present invention described with reference to FIGS. 5 to 11.

The processor 1210 and/or transceiver 1230 can include Application-Specific Integrated Circuit (ASIC), other chipsets, logic circuit and/or data processing apparatus. In case the embodiments are implemented by software, the techniques described above can be implemented in the form of a module (a process or a function) which carries out the aforementioned function. The module can be stored in the memory 1220 and can be executed by the processor 1210. The memory 1220 can be installed inside the processor 1210, or the memory 1220, being installed separately outside the processor 1210, can be connected to the processor 1210 functionally through various means known in the field.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless local area network, the method comprising:

generating, by a transmitter, a physical layer protocol data unit (PPDU) including a short training field, a long training field, a signal field and a data field; and transmitting, by the transmitter, the PPDU over a 1 MHz bandwidth in sub-1 GHz bands, wherein fixed pilot tones for the data field are included in pre-defined subcarriers for each symbol of the data field, wherein the fixed pilots for the data field are mapped in N orthogonal frequency division multiplexing (OFDM) symbols as follows:

when k is −7, $P_n^k = \Psi_{n \bmod 2}$, when k is 7, $P_n^k = \Psi_{(n+1) \bmod 2}$, and when k is neither 7 nor −7, $P_n^k = 0$, where $P_n^k$ denotes a value of a pilot at subcarrier k for OFDM symbol n, n=0, . . . , N−1, 'mod' denotes modulo operation and $\Psi_0 = 1$, $\Psi_1 = -1$, wherein a guard interval (GI) used in the data is a short GI or a long GI, wherein a GI used for an initial symbol in the data field is set to the long GI when the short GI is determined to be used for the data field.

2. The method of claim 1, wherein the signal field indicates the short GI when the short GI is determined to be used for the data field.

3. The method of claim 1, wherein the short training field is transmitted in 4 first symbols and the long training field is transmitted in 4 second symbols that are subsequent to the 4 first OFDM symbols.

4. The method of claim 3, wherein the signal field is transmitted in 6 third symbols that are subsequent to the 4 second symbols.

5. The method of claim 1, wherein the signal field includes information indicating whether a repetition in the data field occurs.

6. A wireless station for transmitting data in a wireless local area network, comprising:

a transmitter that transmits a radio signal; and a processor coupled to the transmitter, that:

generates a physical layer protocol data unit (PPDU) including a short training field, a long training field, a signal field and a data field; and controls the transmitter to transmit the PPDU over a 1 MHz bandwidth in sub-1 GHz bands, wherein the fixed pilots for the data field are mapped in the N orthogonal frequency division multiplexing (OFDM) symbols as follows:

when k is −7, $P_n^k = \Psi_{n \bmod 2}$, when k is 7, $P_n^k = \Psi_{(n+1) \bmod 2}$, and when k is neither 7 nor −7, $P_n^k = 0$, where $P_n^k$ denotes a value of a pilot at subcarrier k for OFDM symbol n, n=0, . . . , N−1, 'mod' denotes modulo operation and $\Psi_0=1$, $\Psi_1=-1$, wherein a guard interval (GI) used in the data is a short GI or a long GI, wherein a GI used for an initial symbol in the data field is set to the long GI when the short GI is determined to be used for the data field.

7. The wireless station of claim 6, wherein the signal field indicates the short GI when the short GI is determined to be used for the data field.

8. The wireless station of claim 6, wherein the short training field is transmitted in 4 first symbols and the long training field is transmitted in 4 second symbols that are subsequent to the 4 first OFDM symbols.

9. The wireless station of claim 8, wherein the signal field is transmitted in 6 third symbols that are subsequent to the 4 second symbols.

10. The wireless station of claim 6, wherein the signal field includes information indicating whether a repetition in the data field occurs.

\* \* \* \* \*